United States Patent [19]

Barclay et al.

[11] Patent Number: 5,136,011

[45] Date of Patent: Aug. 4, 1992

[54] TRIAZINE NETWORKS WITH HOMOGENEOUS AND ORIENTED STRUCTURES AND METHOD FOR MAKING SAME

[75] Inventors: George G. Barclay; Christopher K. Ober, both of Ithaca; Konstantinos I. Papathomas, Endicott; David W. Wang, Vestal, all of N.Y.

[73] Assignees: Cornell Research Foundation, Ithaca; International Business Machines Corporation, Armonk, both of N.Y.

[21] Appl. No.: 585,544

[22] Filed: Sep. 19, 1990

[51] Int. Cl.$^5$ .............. C08G 8/04; C08G 63/02; C08G 63/54

[52] U.S. Cl. .................. 528/162; 528/190; 528/192; 528/205; 528/211; 528/423

[58] Field of Search .......... 528/162, 119, 170, 230, 528/121, 172, 190, 192, 205, 211, 322, 391, 392, 422, 271, 423

[56] References Cited

U.S. PATENT DOCUMENTS

| | | | |
|---|---|---|---|
| 4,608,434 | 8/1986 | Shimp | 528/119 |
| 4,785,075 | 11/1988 | Shimp | 528/119 |
| 4,839,460 | 6/1989 | Molzahn | 528/230 |
| 4,851,279 | 7/1989 | Das et al. | 528/162 |
| 4,978,727 | 12/1990 | Das et al. | 528/162 |
| 4,983,709 | 1/1991 | Jackson | 528/170 |
| 4,988,780 | 1/1991 | Das et al. | 528/162 |

*Primary Examiner*—John Kight, III
*Assistant Examiner*—John M. Cooney
*Attorney, Agent, or Firm*—Salzman & Levy

[57] ABSTRACT

The present invention features a highly oriented, triazine superstructural network, whose structural alignment is magnetically induced in the liquid crystalline phase during the curing process of its liquid crystalline cyanate ester precursor. High mechanical strength cross-linked network structures are prepared from a new class of liquid crystalline dicyanate compounds. Optionally ring substituted di-(4-hydroxyphenyl)-terephthalate is synthesized as a precursor in the preparation of highly structured triazine networks. The orientation of the triazine networks has been accomplished by magnetically aligning the liquid crystalline phase of the precursor during the curing reaction.

15 Claims, 3 Drawing Sheets

TRIAZINE NETWORKS WITH HOMOGENEOUS AND ORIENTED STRUCTURES AND METHOD FOR MAKING SAME

FIELD OF THE INVENTION

The invention relates to high mechanical strength materials, and more particularly to a highly oriented, triazine superstructural network, whose structural alignment is magnetically induced in the liquid crystalline phase during the curing process of its liquid crystalline cyanate ester precursor.

BACKGROUND OF THE INVENTION

In the quest for high strength structural materials having superior mechanical properties, such as high tensile strength and elongation, it has recently been discovered that such materials could be achieved by the preparation of structured polymeric networks derived from liquid crystalline precursors.

Recent discoveries in this field involve the use of liquid crystalline diglycidyl compounds and diisocyanate compounds in the preparation of structured networks. Such networks have been prepared utilizing polymerization, polyaddition, and polycondensation processes, as disclosed in the U.S. Pat. Nos. 4,762,901, issued Aug. 9, 1988, and 4,764,581, issued Aug. 16, 1988, to H. P. Muller et al. Such processes were accomplished during the mesophase temperature range of the liquid crystalline, polyfunctional unit.

Other recent work has involved the polymerization of diacrylate Schiff bases from the nematic state utilizing a magnetic field to orient the cross-linked network, as reported in the literature by B. S. Clough, A. Blumstein, and E. C. Hsu, *Macromolecules*, 9(1), 123, 1976.

The present invention seeks to prepare high mechanical strength cross-liked network structures from a new class of liquid crystalline dicyanate compounds. The invention has synthesized optionally ring substituted di-(4-hydroxyphenyl) terephthalate as a precursor in the preparation of highly structured triazine thermosetting networks. The orientation of the triazine networks has been accomplished by magnetically aligning the liquid crystalline phase of the precursor during the curing reaction.

The triazine thermosets of this invention have a number of advantages over the well known epoxy matrices. Reaction conversions of the triazine are nearly one hundred percent, resulting in few, if any, unreacted end groups. In addition, there are no secondary reactive groups produced during the course of the reaction. By contrast, the epoxy chemistries produce alcohols, whose volatility is undesirable, and present a production hazard.

It is also contemplated by the current invention to use the newly synthesized dicyanate ester precursors in admixture with other well known resins, such as the aforementioned epoxies and acrylates, to form new, high strength materials.

SUMMARY OF THE INVENTION

In accordance with the present invention, there is provided a liquid crystalline cyanate ester having the formula:

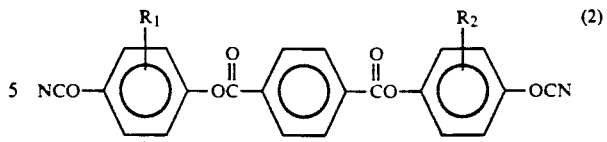

wherein: $R_1$ and $R_2$ each independently represent hydrogen, a halogen, a methoxy, an ethoxy, an acetyl group, a nitro group, or an alkyl having 1 to 6 carbon atoms.

The liquid crystalline cyanate ester is prepared by reacting a bisphenol of the formula:

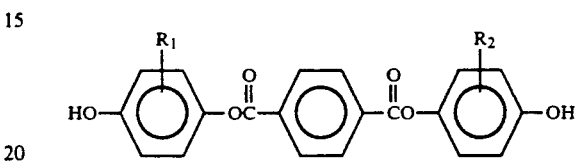

with a cyanogen halide in the presence of triethylamine. The preferred cyanogen halide is cyanogen bromide.

The liquid crystalline cyanate ester is then used to synthesize a triazine cross-linked network of repeating base units having the formula:

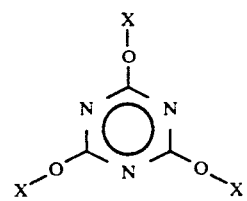

wherein X comprises the cross-linking moiety of formula:

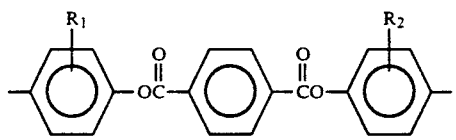

The oriented triazine structure is accomplished by exothermically cyclotrimerizing the cyanate ester utilizing a coordination metal (e.g., zinc, cobalt or manganese) catalyst and magnetically aligning the liquid crystalline phase during curing.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Figure 1:
FIGS. 1 and 2 are photographic, wide angle X-ray diffraction views of the orientation of the triazine structure of this invention.

Generally speaking the invention features new chemistries for producing high strength materials having a triazine cross-linked network. The oriented triazine structure is achieved by magnetically aligning newly synthesized precursor dicyanate compounds in the liquid crystalline phase.

New, liquid crystalline dicyanate compounds of optionally ring substituted di-(4-hydroxyphenyl)-terephthalate are synthesized and used to produce highly structured triazine thermosetting networks. Moreover, a process for the preparation of oriented triazine cross-liked networks, resulting from magnetic field induced alignment of the liquid crystalline phase during the curing reaction, is herein disclosed.

Triazine thermosets have a number of advantages over an epoxy matrix. Reaction conversions approach 100%. Therefore, there are few unreacted end groups which can complicate material properties. No secondary reactive groups are produced during the course of reaction. Only triazine rings are formed, whereas epoxies produce alcohol groups. Finally no volatile by-products are produced in the reaction.

The dicyanate compounds of optionally ring substituted di-(4-hydroxyphenyl)-terephthalate were previously not known. The process for the preparation of these dicyanate compounds involves reacting bisphenol, formula (1), with a cyanogen halide, preferably cyanogen bromide, in the presence of triethylamine. The reaction solvent of preference is anhydrous acetone and the reaction temperature is preferably 0°-5° C. The resulting dicyanates show liquid crystalline behavior, having a nematic mesophase.

The invention therefore discloses dicyanate compounds of formula (2)

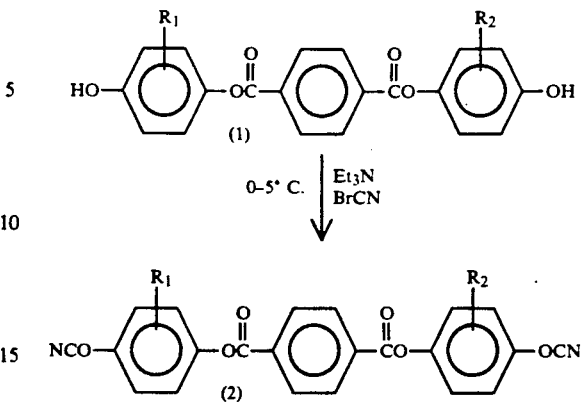

in which $R_1$ and $R_2$ denote hydrogen, halogen or alkyl having 1 to 6 carbon atoms.

The invention also relates to the thermal cyclotrimerization of dicyanates of formula (2) within the liquid crystalline phase to produce highly ordered triazine thermosetting networks, formula (3). A curing catalyst, preferably zinc, cobalt or manganese octoate, napthanate or latent acetylacetonate, is used to reduce the temperature at which the cross-linking reaction occurs to within the liquid crystalline temperature range of these compounds.

Surprisingly it has been found that the resulting triazine cross-linked networks have a characteristic liquid crystalline texture as shown by polarized light microscopy. This is indicative of a highly structured polymeric network. It was expected that the triazine cross-link, due to its bulky nature, would disrupt the liquid crystalline phase during curing. A less ordered polymeric matrix was therefore expected. X-ray diffraction studies showed that these triazine networks, cross-linked within the liquid crystalline phase, had a single broad diffraction peak at 4.4Å, which is characteristic of a nematic liquid crystal. During the curing reaction, triazine formation may introduce a discotic character to the mesophase and therefore to the final network.

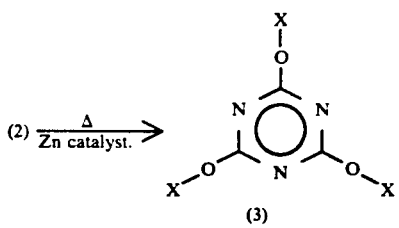

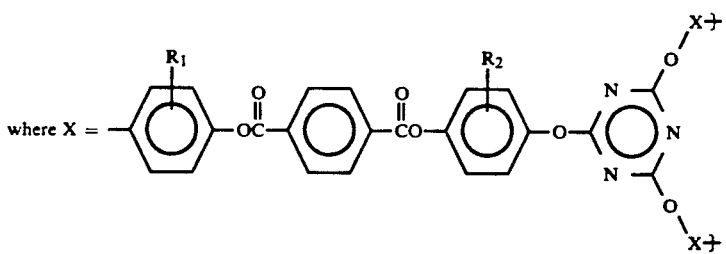

Figure 2:

As another aspect of the present invention, triazine cross-linked networks with oriented architectures (i.e., polymeric networks with a distinct directional orientation of the molecules within the cross-linked material)

can be prepared. The process for orienting the molecules within these triazine cross-linked thermosets involves the thermal cyclotrimerization of these dicyanate compounds within the liquid crystalline temperature range under the influence of a magnetic field. Surprisingly, a degree of orientation in the triazine cross-linked network was achieved. Once again it was expected that the formation of the bulky triazine cross-link would hinder the ability of the liquid crystalline phase to align during the curing process. Orientation was measured by wide angle X-ray diffraction (WAXD). For the unoriented network the diffracted intensity is azimuthally isotropic with a d-spacing of 4.4Å (FIG. 1). For the oriented network the diffracted X-ray intensity is limited to a specific range in azimuthal angle with a d-spacing of 4.4Å (FIG. 2).

EXAMPLE 1

Preparation of the dicyanate of di-(4-hydroxy-methylphenyl)-terephthalate, formula (2), $R_1$ and $R_2 = CH_3$ The di-(4-hydroxy-methylphenyl)-terephthalate (3.00g, 0.0079 mol.) and the cyanogen bromide (2.00g, 0.019 mol.) were dissolved in anhydrous acetone in a three necked round bottom flask fitted with a dropping funnel and a mechanical stirrer. Then under nitrogen at 0°-5° C., triethylamine (1.92g, 0.0019 mol.) dissolved in acetone was added dropwise with stirring. The resulting viscous reaction mixture was stirred for an additional forty minutes at 0°-5° C. This was then poured into ice/water and the resultant precipitate filtered off, washed with water and dried in vacuo. Thin layer chromatography (TLC) on silica gel with chloroform as the eluent showed the crude reaction product to consist of a major product ($R_f=0.57$) and a minor product ($R_f=0.19$). The product was purified by fractional reprecpitation from chloroform/hexanes, the latter fraction being kept and dried in vacuo. This consisted of solely the major product, yield 2.04g (65% of theory).

Melting point (uncorrected): 144°-152° C. The broad melting behavior is due to different isomers depending upon position of methyl group on the phenyl ring of di-(4-hydroxy-methylphenyl)-terephthalate.

Differential scanning calorimetry (DSC) showed broad melting behavior with a peak maximum at 148° C. DSC and polarized light microscopy show a liquid crystalline nematic phase after melting, which clears at 180° C. On cooling a crystallization exotherm occurs at 112° C.

$^1$H nmr ($d^6$ acetone): δ 2.35 and 2.40 (6H, 2 singlets relative ratio 1:2 respectively; therefore a mixture of isomers depending upon the position of the methyl group on the phenyl ring.); 7.30-7.67 (6H, complex multiplets, aromatic); 8.30-8.47 ppm (4H, 3 singlets, aromatic).

Infrared spectroscopy (KBr disc) shows the characteristic nitrile stretching absorption at 2210 cm$^{-1}$ and the carbonyl stretching absorption of the ester group at 1740 cm$^{-1}$.

Thermal transition temperatures were obtained on a Perkin Elmer DSC-2C at a heating and cooling rate of 10° C./min. Liquid crystal mesophases were examined using a Leitz polarizing optical microscope at 200X magnification equipped with a Mettler FP-52 hot state. $^1$H nmr spectra were obtained using a Varian XL-200. Infrared spectroscopy was performed using a Nicolet FTIR/44.

EXAMPLE 2

The thermal cyclotrimerization of dicyanates of formula (2)

DSC of the uncatalyzed thermal cyclotrimerization of the dicyanate of di-(4-hydroxy-methylphenyl)-terephthalate shows a reaction exotherm with maximum at 333° C. The addition of 1 part of zinc stearate catalyst to 33 parts by weight of the dicyanate of di-(4-hydroxy-methylphenyl)-terephthalate reduces the temperature at which the cyclotrimerization reaction occurs to an exotherm with a maximum at 165° C., as shown by DSC; that is, to within the liquid crystalline temperature range of this compound.

Samples of the thermoset were preparedly placing the powdered mixture of the dicyanate compound and zinc stearate catalyst into an aluminum mold (25mm×7mm×1 mm) between Teflon ® sheets. The mold was placed into a hot press at a temperature of 165° C.; 1 ton pressure was then applied and the curing reaction allowed to proceed under these conditions for 1 hour. The temperature was then increased to 230° C. (that is above the $T_g$ of the material), after which the sample was allowed to cool to room temperature.

The extent of the cyclotrimerization reaction was followed by infrared spectroscopy. Following the above curing cycle, infrared spectroscopy shows the disappearance of the nitrile stretching absorption of the dicyanate compound.

Samples prepared in this manner were used to determine the thermal and mechanical properties of these materials.

Glass transition temperature ($T_g$), determined by DSC(.C): 171

$T_g$ determined by DMTA (tan δmaximum) (.C): 185

E modulus from dynamic mechanical analysis at 25° C. (MPa): 2500

Coefficient of thermal expansion (z-direction) (ppm/.C): 51

10% decomposition determined by thermogravimetric analysis ( C): 441

The resulting samples cured within the liquid crystalline phase were opaque in contrast to non liquid crystalline triazine thermosets. These triazine crosslinked networks have a characteristic liquid crystalline texture as shown by polarized light microscopy. Sintag X-ray diffraction of these samples showed a single broad diffraction peak with a d-spacing of 4.4Å, characteristic of a nematic liquid crystal.

EXAMPLE 3

Magnetic field induced alignment of the liquid crystalline phase during the curing process Orientation inducted during the curing process was carried out using an Intermagnetics General Corporation superconducting magnet, at a field of 13.5 T. The mixture of the dicyanate of di-(4-hydroxy-methylphenyl)-terephthalate and zinc stearate catalyst was packed into a thin walled quartz vial (10 mm in length and 3 mm in diameter). The sample was then placed in a cylindrical graphite heater preheated to 165° C. in the magnet bore under nitrogen. The sample was held at this temperature for 1 hour. The temperature was then increased to 230° C., after which the sample was allowed to cool to 30° C.

Figure 3:
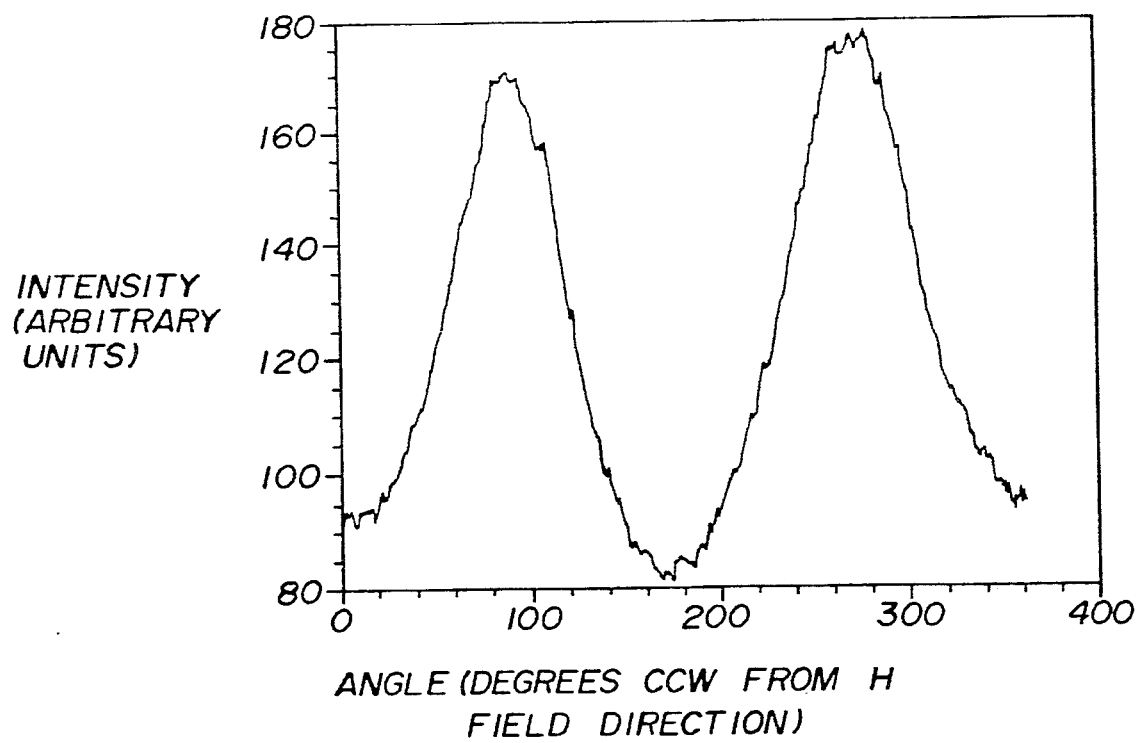
FIG. 3 is a graphical illustration of digitized data from the X-ray diffraction of FIGS. 1 and 2 presented as intensity versus the angle theta, which data was used to calculate the degree of planar orientation of the liquid crystalline domains.

The orientation of the triazine thermoset was measured by wide angle X-ray diffraction (WAXD). Transmission exposures were taken using a Statton camera with Ni-filtered Cu $C_\alpha$ radiation at b 4.5 cm sample-to-film distances (FIGS. 1 and 2). The data was digitized using an RCI system, an annular ring was superimposed on the X-ray image and the subsequent intensity vs. theta data was plotted (FIG. 3).

To estimate the degree of planar orientation of the liquid crystalline domains, the orientation function f was calculated from the data on the azimuthal distribution intensity $I(\alpha)$, using formulae (a) and (b).

$$f = \tfrac{1}{2}(3 \cos^2\phi - 1) \tag{a}$$

$$\cos^2\phi = \frac{\int_0^{\pi/2} I(\phi) \sin\phi \cos^2\phi \, d\phi}{\int_0^{\pi/2} I(\phi) \sin\phi \, d\phi} \tag{b}$$

For an ideally oriented sample, the magnitude $f=1$; and for the homogeneous $f=0$.

The triazine network prepared from the dicyanate of di-(4-hydroxy-methylphenyl)-terephthalate under the influence of a magnetic field had an orientation function $f=0.49$.

Figure 4B:
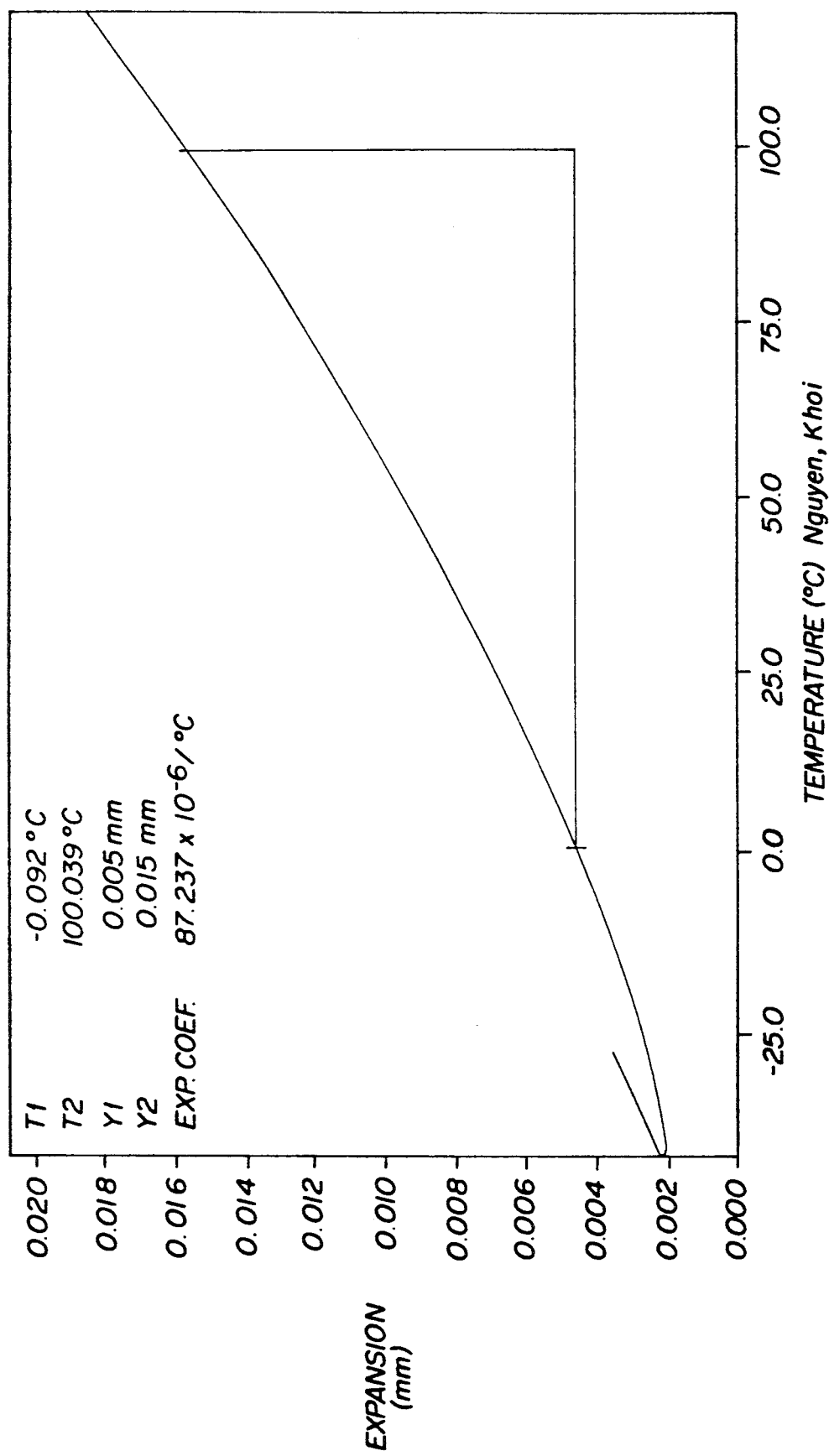
FIGS. 4a and 4b are graphical illustrations of data representing the coefficients of thermal expansion for the triazine network oriented in the direction of both: (1) the applied magnetic field (aligned direction) as shown in FIG. 4a, and (2) perpendicular to the applied magnetic field, as shown in FIG. 4b.
Figure 4A:
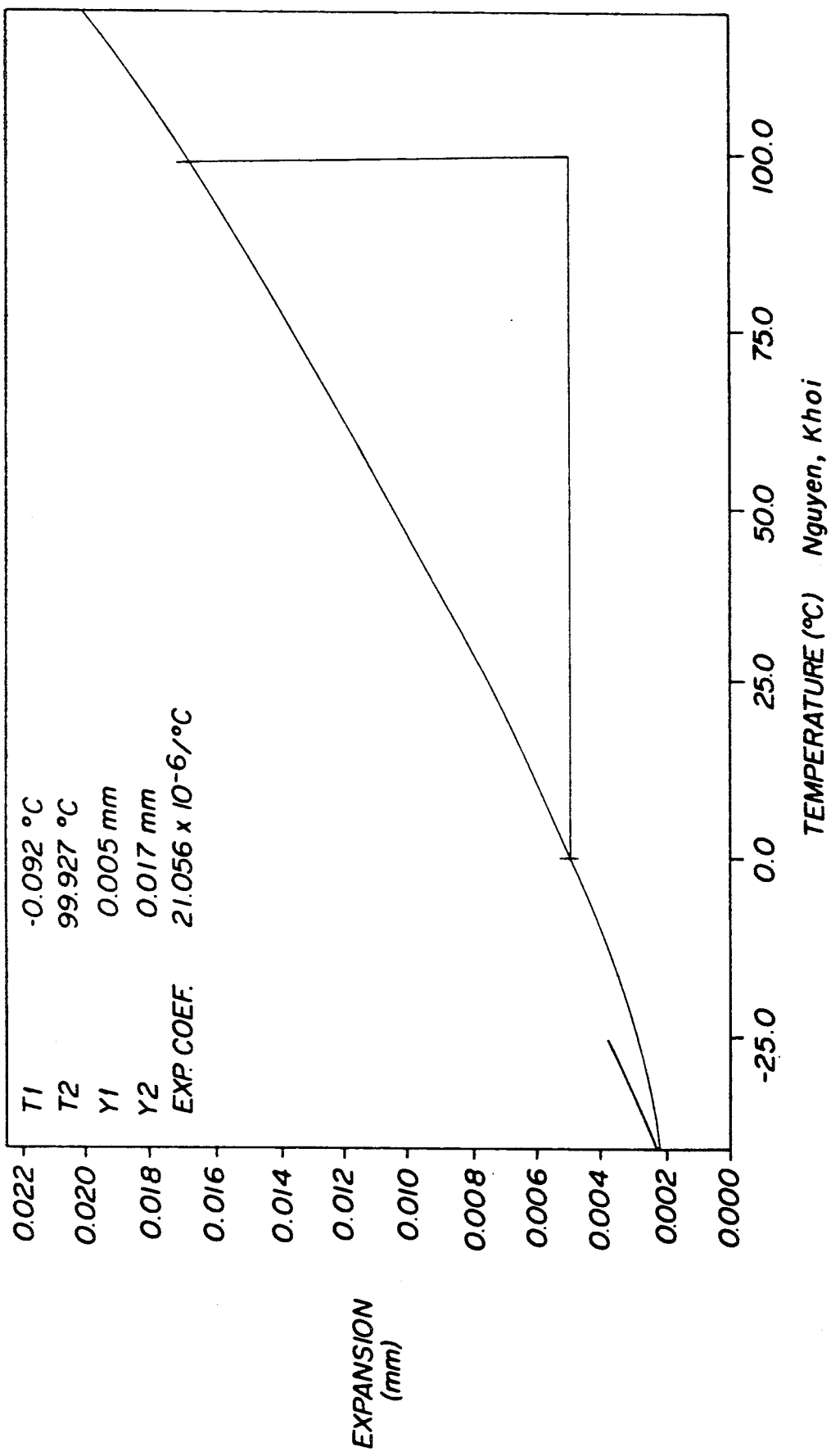

Now referring to FIGS. 4a and 4b, there are illustrated graphs showing the difference in thermal expansion between the triazine network oriented in the direction parallel to the applied magnetic field (shown by FIG. 4a), and the triazine network oriented in the direction perpendicular to the applied magnetic field (depicted by FIG. 4b). The graphs were obtained from an aligned triazine network prepared from the methyl substituted dicyanate.

The graphs clearly show an unusually low coefficient of thermal expansion for the inventive material, and in particular, an extremely low thermal expansion in the magnetically aligned direction of the triazine network.

EXAMPLE 4

Preparation and curing of the dicyanate of di-(4-hydroxychlorophenyl)-terephthalate, formula (2), $R_1$ and $R_2$ =Cl Using the experimental procedure described in Example 1 above, the dicyanate of di-(4-hydroxy-chlorophenyl)-terephthalate 3.00g (0.0072 mol.).
Cyanogen bromide 1.83g (0.0173 mol.).
Triethylamine 1.75g (0.0173 mol.).
Anhydrous acetone as solvent.
The crude product was recrystallized twice from methanol, yield 1.59g (47% of theory).

Melting point (uncorrected): 165°–169° C. Differential scanning calorimetry (DSC) showed a melting point of 171° C. Polarized light microscopy showed a liquid crystalline phase after melting which clears at 188° C.

$^1$H nmr ($d^6$ acetone): $\delta$7.56–7.65 (2H, multiplet, aromatic); 7.72–7.89 (4H, multiplet, aromatic) and 8.37–8.48 ppm (4H, 3 singlets, aromatic). The complex spectrum is due to a mixture of isomers depending upon the position of the chlorine atom of the phenyl ring of di-(4-hydroxy-chloro-phenyl)-terephthalate.

Infrared spectroscopy (KBr disc) shows the characteristic nitrile stretching absorption at 2215cm$^{-1}$ and the carbonyl stretching absorption of the ester group at 1740 cm$^{-1}$.

Using the experimental procedure described in Example 2 above, the dicyanate of di-(4-hydroxy-chloro-phenyl)-terephthalate was cured within the liquid crystalline phase at 180° C.

Samples prepared in this manner were used to determine the thermal and mechanical properties of these materials.

Glass transition temperature ($T_g$), determined by DSC (°C): 190

Coefficient of thermal expansion (z-direction) (ppm/°C): 59

10% decomposition determined by thermogravimetric analysis (.C): 440

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A highly oriented and aligned polymer comprising a triazine cross-linked network of repeating base units of the formula:

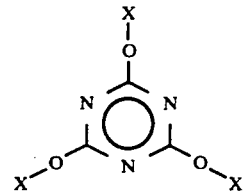

wherein X comprises a cross-linking moiety of the formula:

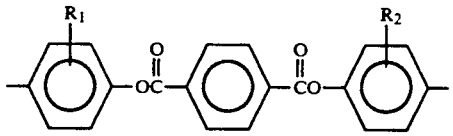

wherein: $R_1$ and $R_2$ each independently represent hydrogen, a halogen or an alkyl having 1 to 6 carbon atoms.

2. The triazine cross-linked network of claim 1, wherein $R_1$ and $R_2$ each comprise a methyl group, respectively.

3. The triazine cross-linked network of claim 1, wherein $R_1$ and $R_2$ each comprise a chlorine, respectively.

4. The method of preparing the triazine cross-linked network polymer of claim 1, comprising the step of:
exothermically cyclotrimerizing a dicyanate of di-(4-hydroxy-methylphenyl)-terephthalate of the formula

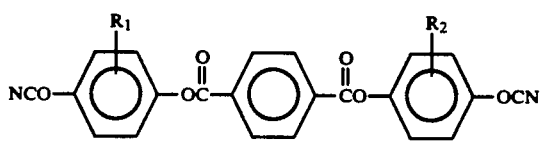

wherein $R_1$ and $R_2$ each independently represent hydrogen, a halogen or an alkyl having 1 to 6 carbon atoms.

5. The method of claim 4, wherein the exothermic cyclotrimerization of said dicyanate of di-(4-hydroxymethylphenyl)-terephthalate is accomplished within its liquid crystalline phase temperature.

6. The method of claim 4, wherein the exothermic cyclotrimerization of said dicyanate of di-(4-hydroxy-methylphenyl)-terephthalate is accomplished in the presence of a coordination metal catalyst.

7. The method of claim 6, wherein said coordination metal catalyst comprises zinc.

8. The method of claim 7, wherein said coordination metal catalyst comprises zinc stearate.

9. The method of claim 7, wherein said coordination metal catalyst comprises zinc octoate.

10. The method of claim 6, wherein said coordination metal catalyst comprises cobalt.

11. The method of claim 6, wherein said coordination metal catalyst comprises manganese 12. The method of claim 5, wherein said exotherxic cyclotrimerization is accomplished within a liquid crystalline phase temperature range by curing said dicyanate of di-(4-hydroxy-methylphenyl)-terephthalate under pressure, and at a temperature less than approximately 180° C.

13. The method of claim 5, further comprising the step of aligning the liquid crystalline phase during the curing of said polymer.

14. The method of claim 5, wherein said aligning is accomplished by magnetic field induction.

15. The method of claim 14, wherein said exothermic cyclotrimerization is accomplished within a liquid crystalline phase temperature range by curing said dicyanate of di-(4-hydroxy-methylphenyl)-terephthalate under pressure, and at a temperature less than approximately 180° C.

* * * * *